(12) United States Patent
Louis et al.

(10) Patent No.: US 8,892,948 B2
(45) Date of Patent: Nov. 18, 2014

(54) CONFIGURATION DEVICE FOR THE GRAPHICAL CREATION OF A TEST SEQUENCE

(75) Inventors: Ulrich Louis, Paderborn (DE); Erkan Bostanci, Paderborn (DE); Dirk Hartmann, Paderborn (DE); Raimund Sprick, Paderborn (DE); Thomas Jaeger, Satzkotten (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 220 days.

(21) Appl. No.: 13/487,871

(22) Filed: Jun. 4, 2012

(65) Prior Publication Data
US 2012/0311386 A1 Dec. 6, 2012

(30) Foreign Application Priority Data

Jun. 3, 2011 (EP) .................................... 11004526

(51) Int. Cl.
*G06F 11/00* (2006.01)
*G06F 9/44* (2006.01)

(52) U.S. Cl.
CPC ...................................... *G06F 8/37* (2013.01)
USPC ........................................................ 714/33

(58) Field of Classification Search
CPC ............ G06F 11/3688; G06F 11/3684; G06F 11/263; G06F 11/3664; G06F 11/3414; G06F 11/3672; G06F 11/368; G06F 11/2294; G06F 11/3696; G06F 11/2273; G06F 11/3692; G06F 8/34; G06F 11/079; G06F 11/349
USPC ........................................................ 714/33
See application file for complete search history.

(56) References Cited

U.S. PATENT DOCUMENTS

| | | | | |
|---|---|---|---|---|
| 6,128,759 A * | 10/2000 | Hansen | ......................... | 714/738 |
| 6,341,361 B1 * | 1/2002 | Basto et al. | ................... | 714/726 |
| 7,228,461 B2 * | 6/2007 | Krietemeyer et al. | .......... | 714/45 |
| 8,117,591 B1 * | 2/2012 | Michelsen | ..................... | 717/109 |
| 8,136,088 B2 * | 3/2012 | Makowski et al. | ........... | 717/109 |
| 8,230,390 B2 * | 7/2012 | Koster | .......................... | 717/109 |

(Continued)

FOREIGN PATENT DOCUMENTS

EP          1 662 381 A1     5/2006

OTHER PUBLICATIONS

Lynette Van Zijl et al.; "A generic Development Platform for ASD Therapy Tools", Jan. 1, 2010, pp. 1-8.

*Primary Examiner* — Bryce Bonzo
(74) *Attorney, Agent, or Firm* — Muncy, Geissler, Olds & Lowe, P.C.

(57) ABSTRACT

A configuration device for the graphical creation of at least one test sequence for controlling a test device having at least one electronic computer. The test device is controllable according to the created test sequence. The configuration device has at least one display device, graphical library functional elements being displayed with the display device in a library field. The test sequence can be created by placing at least one instance of a library functional element in a configuration field. The instance of a library functional element is placed in the configuration field. The graphical library functional element can be provided with a function placeholder, whereby the function placeholder in the instance of the library functional element can be provided with an instance functionality, whereby the reference of the instance of the library functional element to the library functional element is retained.

9 Claims, 9 Drawing Sheets

(56) References Cited

U.S. PATENT DOCUMENTS

| | | | |
|---|---|---|---|
| 2004/0046806 A1* | 3/2004 | Makowski et al. | 345/853 |
| 2004/0075689 A1* | 4/2004 | Schleiss et al. | 345/771 |
| 2005/0223295 A1* | 10/2005 | Hermes et al. | 714/38 |
| 2006/0117043 A1* | 6/2006 | Dinges et al. | 707/100 |
| 2007/0061625 A1* | 3/2007 | Acosta et al. | 714/38 |
| 2007/0168745 A1* | 7/2007 | Alam et al. | 714/38 |
| 2007/0174699 A1* | 7/2007 | Clementi | 714/25 |
| 2007/0226555 A1* | 9/2007 | Raines | 714/724 |
| 2011/0066889 A1* | 3/2011 | Kikuchi | 714/32 |
| 2011/0066892 A1* | 3/2011 | Gardner et al. | 714/37 |
| 2013/0311827 A1* | 11/2013 | Drory et al. | 714/32 |
| 2014/0059387 A1* | 2/2014 | McMahan et al. | 714/33 |

* cited by examiner

CONFIGURATION DEVICE FOR THE GRAPHICAL CREATION OF A TEST SEQUENCE

This nonprovisional application claims priority under 35 U.S.C. §119(a) to European Patent Application No. EP11004526.7, which was filed on Jun. 3, 2011, and which is herein incorporated by reference.

BACKGROUND OF THE INVENTION

1. Field of the Invention

The invention relates to a configuration device for the graphical creation of at least one test sequence for controlling a test device having at least one electronic computer unit, whereby the test device can be controlled according to the created test sequence, whereby the configuration device has at least one display device, graphical library functional elements being displayed with the display device in a library field, whereby the test sequence can be created by placing at least one instance of a library functional element in a configuration field, whereby the instance of a library functional element, said instance being placed in the configuration field, references the library functional element itself.

2. Description of the Background Art

Configuration devices are known from the conventional art and are used as a technical tool in order to selectively address and control a test device (e.g., "AutomationDesk 3.2, Test and Experiment Software", Product Description, dSPACE 2011). The test device typically is a high-performance simulation computer, which often has a number of electronic computer units and assigned I/O devices, whereby a device-under-test, such as, e.g., a control device, is connected to the test device; this corresponds to a typical structure of a hardware-in-the-loop system.

The test sequence is a selective control of the test device and the I/O components typically comprising the test device, so that the device-under-test connected to the test device is supplied with specific signals. The response of the device-under-test to the stimulation is then also determined with the test device with the use of measurement techniques and compared with the expected behavior, so that it can be determined whether the device-under-test behaves as desired. Frequently, the test device is equipped with a real-time-capable operating system, so that the time response of the test sequence can also be predefined and the time response of the connected device-under-test can be evaluated.

As in other fields, graphical programming has proven extremely useful for the creation of test sequences as well, whereby this is understood to be the description of the test sequence by block diagrams. The sequence of test events is described by a series of functional elements depicted as blocks.

The configuration device can be implemented in a computer different from the test device and be connected to the test device only via a data connection. It is then possible that the created test sequence is carried out in the configuration device itself and the test device is provided only with corresponding instructions for carrying out the test sequence. It is possible equally well that the graphically created test sequence is converted into an executable program with the aid of the configuration device and this program is run on the test device. It is also possible that the configuration device and the test device coincide in terms of equipment; the precise device-related configuration is not relevant in the present case. Configuration devices known from the state of the art typically have a basic configuration of functions, which can be used during the creation of a test sequence; this basic configuration consists of libraries of graphical functional elements. Examples of such library functional elements are a loop functionality (for/while) or a conditional functionality (if-then-else); also important are corresponding library functional elements, which represent the test device, so that the test device is accessible in terms of hardware via the test sequence.

The aforementioned libraries are not necessarily predefined; such libraries can also be created by the user of the configuration device.

In the graphical creation of a test sequence, the typical approach is to select a graphical library functional element from a library shown in a library field and to place the selected graphical library functional element in a configuration field ("drag-and-drop"). The library functional element placed in the configuration field is not the library functional element of the library itself, but an instance of the graphical library functional element, whereby this instance is connected to the library functional element, in other words, references the library functional element. This means that a subsequent change in the library functional element within the library also has an effect on the instances of this graphical library functional element in the test sequence in which instances of the library functional element are used.

When the instance of a library functional element is to be changed within a test sequence, then this is only possible in that the reference to the library functional element is no longer used and the test sequence receives a copy of the library functional element instead of the reference in the library. In fact, this (modified) copy of the functional element can then be defined again as a library functional element, but this has the consequence that the functional element libraries increase constantly, even if only minor variations of existing functional elements are created. It is disadvantageous here that desired changes of a basic functionality, which is the same in all functional elements, either must occur locally in different test sequences, when there is no longer a reference to the library element, or, the change must be made in each different version of the library functional element, which is also work-intensive.

The work with possibly only very slightly different versions of a library functional element or of copies of these functional elements in test sequences can be worked around in the state of the art only in that a comprehensive library functional element covers all existing versions, whereby there is the risk, however, that a poorly understandable functional structure arises, which contains a complicated case control for the differentiation and selective activation of function modifications.

SUMMARY OF THE INVENTION

It is therefore an object of the present invention to provide a configuration device for the graphical creation of a test sequence, the device enables an improved management and implementation of function modifications in instances of graphical library functional elements.

The configuration device is attained in an embodiment, in that the graphical library functional element can be provided with a function placeholder, whereby the function placeholder in the instance of the library functional element can be provided with an instance functionality, whereby the reference of the instance of the library functional element to the library functional element is retained. It is therefore possible to provide in a graphical library functional element a place that enables individualization of an instance of this graphical library functional element, namely, in that an individual functionality of the instance—the instance functionality—is stored in the place of the function placeholder. This measure makes it possible to realize different versions of a library functional element, whereby the common functionality of all versions or all instances of the library functional element can be changed centrally at one place, namely, in the graphical library functional element itself. The instance functionality of each instance of the graphical library functional element must or should be stored only in an appropriate place such as in a file that contains the corresponding test sequence.

In an embodiment of the configuration device, it is provided that a test sequence created in the configuration field or a partial test sequence can be defined as a library functional element, so that graphical library functional elements can be created that already have a function placeholder.

In another embodiment of the configuration device of the invention, it is provided that in a reduced display of the instance of a graphical library functional element with a function placeholder, only the function placeholder is shown. This is advantageous, because the attention of the user of the configuration device is directed immediately also to the possibility of storing an instance functionality and the—perhaps very extensive—predefined and invariable functionality of the library functional element is moved into the background.

In an embodiment of the configuration device, function placeholders can be used within function placeholders, so that even when by defining an instance functionality and subsequent derivation of a new library functional element from the functional element, individualized in part in each case, a new library functional element results, the new library functional element in turn having a function placeholder.

It is likewise possible to provide a functional element individualized via an instance functionality over and over again with a function placeholder, so that also over generations of library functional elements the possibility of individualizing a functional element by defining an instance functionality is retained; the function placeholder can be used virtually recursively.

In an embodiment of the configuration device, the different versions of the instance functionality of the function placeholder of a graphical library functional element can be determined and displayed in the display device. The configuration device is therefore capable of recognizing different versions—in one test sequence or also from a number of test sequences—of the instance functionality in instances of a graphical library functional element and displaying them to the user, so that a rapid overview of the function versions can be obtained. This is advantageous primarily in association with the configuration device, in which the function placeholder of an instance of a library functional element can be assigned an already existing version of the instance functionality of the function placeholder. This works out especially simply, when the different versions of the instance functionality are shown and a version can be selected and becomes the instance functionality of the instance of the library functional element in question.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
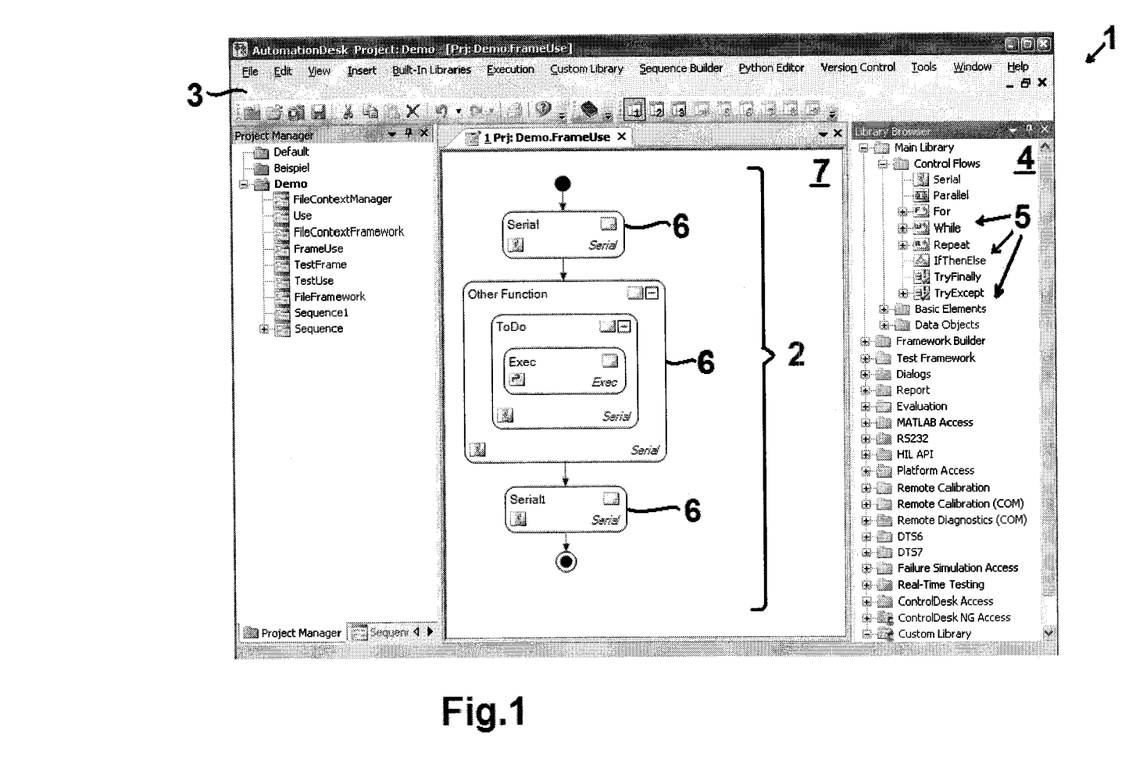
FIG. 1 shows a configuration device with a configuration field.

FIG. 1 in an overview first shows part of a configuration device 1 known in principle from the state of the art for the graphical creation of a test sequence 2, which is used in each case to control a test device (not shown) having at least one electronic computer unit.

FIG. 1 shows in particular a display device 3 of configuration device 1, whereby graphical library functional elements 5 are displayed with display device 3 in a library field 4. Test sequence 2 was created by placing instances 6 of a number of library functional elements 5 in a configuration field 7. Instances 6 placed in configuration field 7 of library functional elements 5 reference the corresponding library functional element 5 in the library.

Figure 2A:
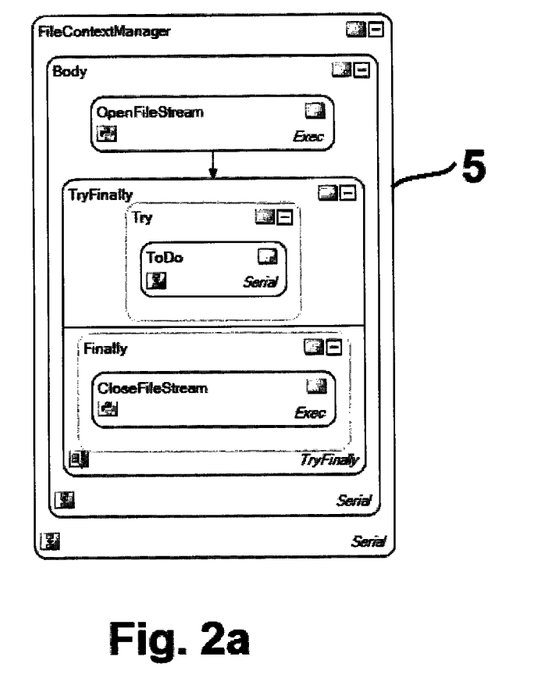
FIGS. 2a-2d show a graphically created test sequence.

Working with graphical library functional elements 5 or with instances 6 of these library functional elements 5 is shown by way of example in FIGS. 2a-2d, as is known from the conventional art. A library functional element 5, which can be called the "FileContextManager," is shown in FIG. 2a. In the example, it should be possible with this library functional element 5 to open, write to, and close a file. The opening of the file is realized in the functional element "OpenFileStream" and the closing of the file is implemented by the functional element "CloseFileStream." What is to be written to the file is to be stored specifically in the functional element "ToDo." Library functional element 5 shown in FIG. 2a could already be a fixed part of a library, but functional element 5 could also be modeled in configuration field 7 from elementary graphical library functional elements and then be defined as a library functional element.

Figure 2B:
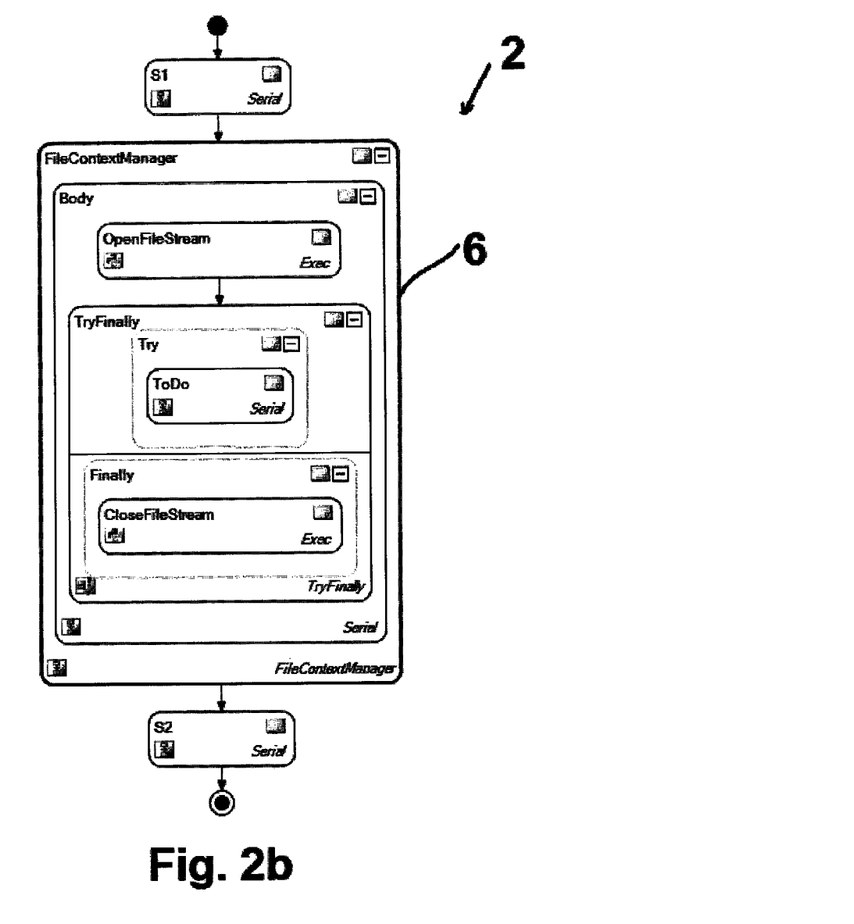

The use of library functional element 5 from FIG. 2a in a test sequence 2 is shown in FIG. 2b, whereby the test sequence begins with an initial functionality "S1" and is ended with an ending functionality "S2," whereby between these two functionalities the content of instance 6 of library functional element 5 "FileContextManager" is executed; it is important that functional element "FileContextManager" shown in FIG. 2b is an instance 6 of graphical library functional element 5 "FileContextManager" from FIG. 2a. The fact that instance 6 "FileContextManager" of graphical library functional element 5 "FileContextManager" references library functional element 5 "FileContextManager" in the library means that instance 6 is only a link to the corresponding library functional element 5, with the consequence that a change in the graphical library functional element 5 automatically also affects the—and each—instance 6 of this graphical library functional element 5.

Figure 2C:
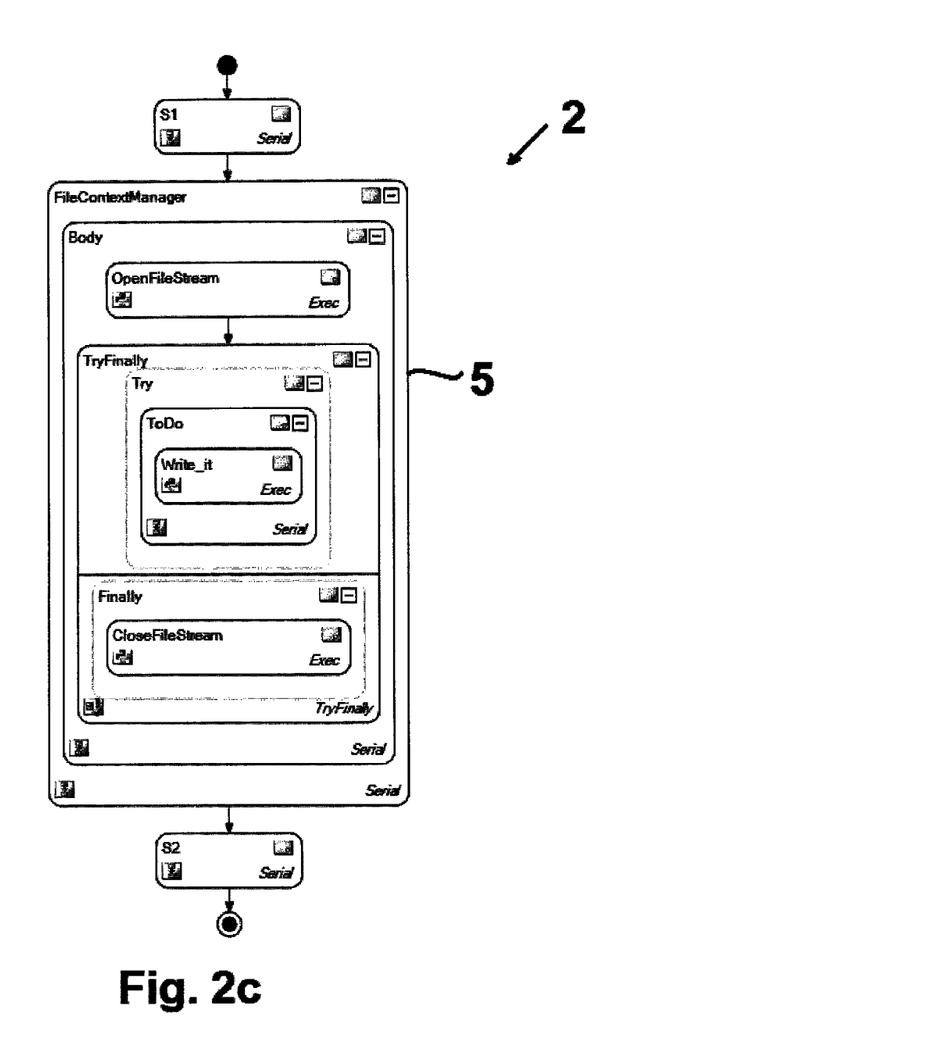

The instance relationship between instance 6 of a library functional element 5 and library functional element 5 should not be maintained when, as shown in FIG. 2c, the functionality of instance 6 of the library functional element 5 is in any way changed, expanded, or shortened. In FIG. 2c, for example, a function addition has been made in that the functional element "Write_it" has been added to the functional element "ToDo." The functional element "FileContextManager" shown in FIG. 2c therefore is no longer an instance of library functional element 5 "FileContextManager", but a modified copy, which is independent.

Figure 2D:
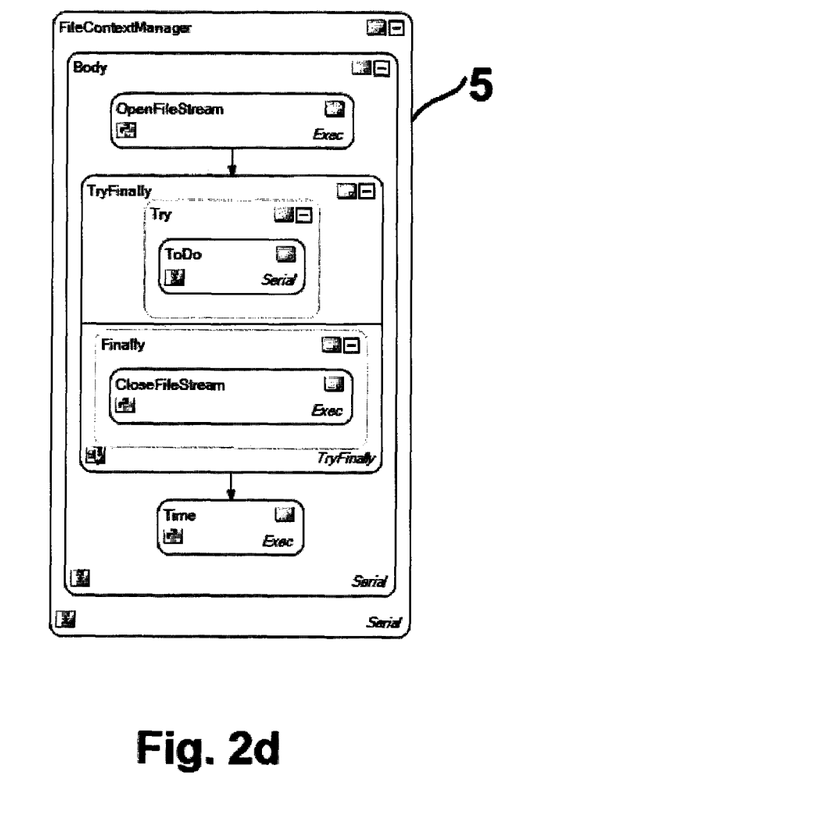

A change in the graphical library functional element 5 "FileContextManager," as shown in FIG. 2d, is no longer reproduced in the functional element "FileContextManager" shown in FIG. 2c, but must be manually updated, provided this is desired. In fact, the functional element "FileContextManager," shown in FIG. 2c, can be defined in turn as a graphical library functional element, whereby naturally a name different from "FileContextManager" should be used; such a procedure, however, leads to a plurality of library functional elements, all of which must be updated separately from one another.

Figure 3:
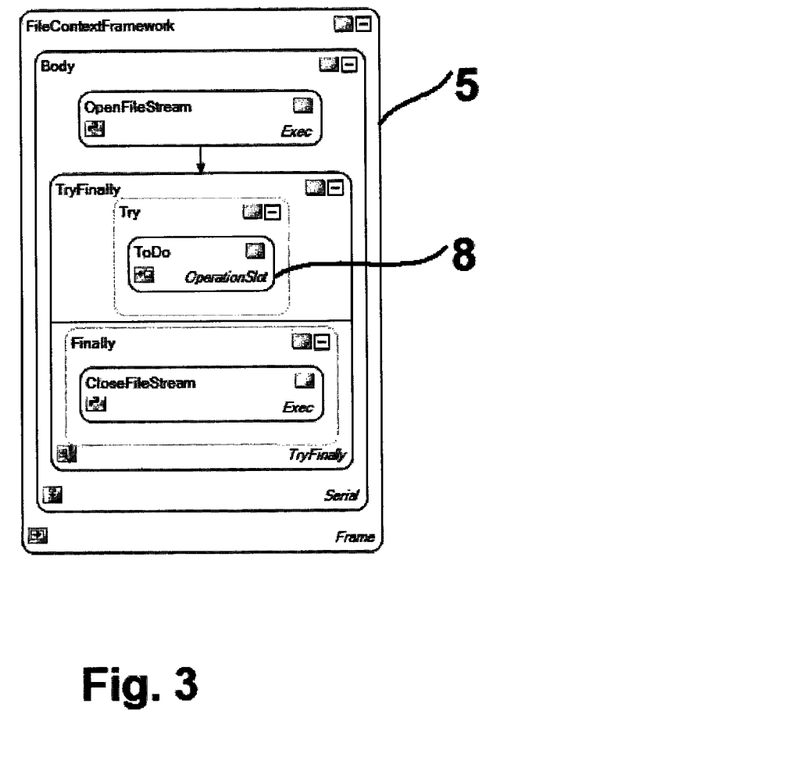
FIG. 3 shows an exemplary embodiment of a graphical library functional element provided with a function placeholder.

A graphical library functional element 5 realized by the invention is shown in FIG. 3; it does not seem to differ at first from an implementation which could be carried out with means already known from the state of the art, for example, therefore by the implementation according to FIG. 2a. The major difference, however, is that here the functional element "ToDo" is not of the type "Serial," as in the exemplary embodiment according to FIG. 2a, but rather the functional element "ToDo" is realized as function placeholder 8 "OperationSlot," whereby function placeholder 8 makes it possible to provide an instance functionality in an instance 6 of library functional element 5, whereby the reference of this instance 6 of library functional element 5 to library functional element 5 is retained, in contrast to the behavior in the state of the art. It is therefore possible to create a plurality of instances 6 of graphical library functional element 5, in a test sequence or also in a number of test sequences, and to provide this plurality of instances 6 each with an individual instance functionality, whereby each instance 6 further has a reference to the corresponding library functional element 5. This has the result that graphical library functional element 5 in the corresponding library can be changed, and all instances 6, individualized by its instance functionality, of library functional element 5 make this change and in fact despite the individualization by the instance functionality. This functionality is realized in that the instance functionality stored in the function placeholder is not part of the corresponding library functional element 5.

Figure 4A:
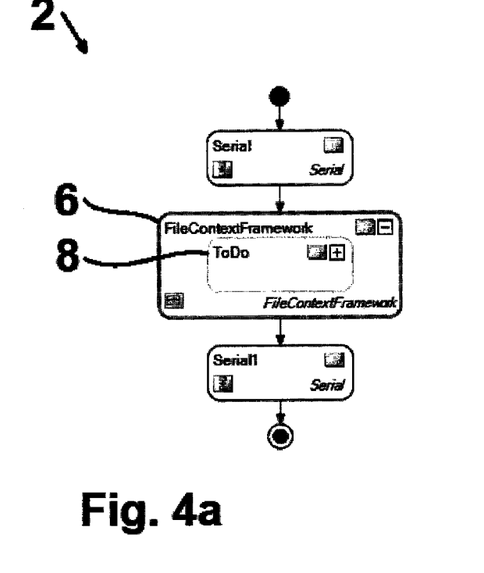
FIG. 4 shows the use of the library functional element, provided with a function placeholder, in a test sequence.
Figure 4B:
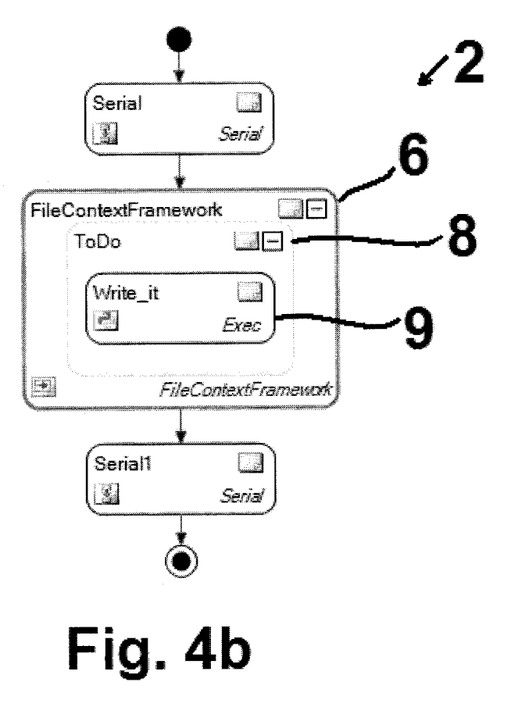

The use of the graphical library functional element 5 "FileContextFrameWork," known from FIG. 3, within the scope of a test sequence 2 is shown in FIG. 4, whereby here in a reduced display of instance 6 of library functional element 5, shown in FIG. 3, with function placeholder 8 "ToDo," only function placeholder 8 "ToDo" is shown (FIG. 4a). In a somewhat expanded display thereto (FIG. 4b), only the instance functionality 9 "Write_it" is shown, but not the more extensive functionality of graphical library functional element 5 according to FIG. 3.

Figure 5:
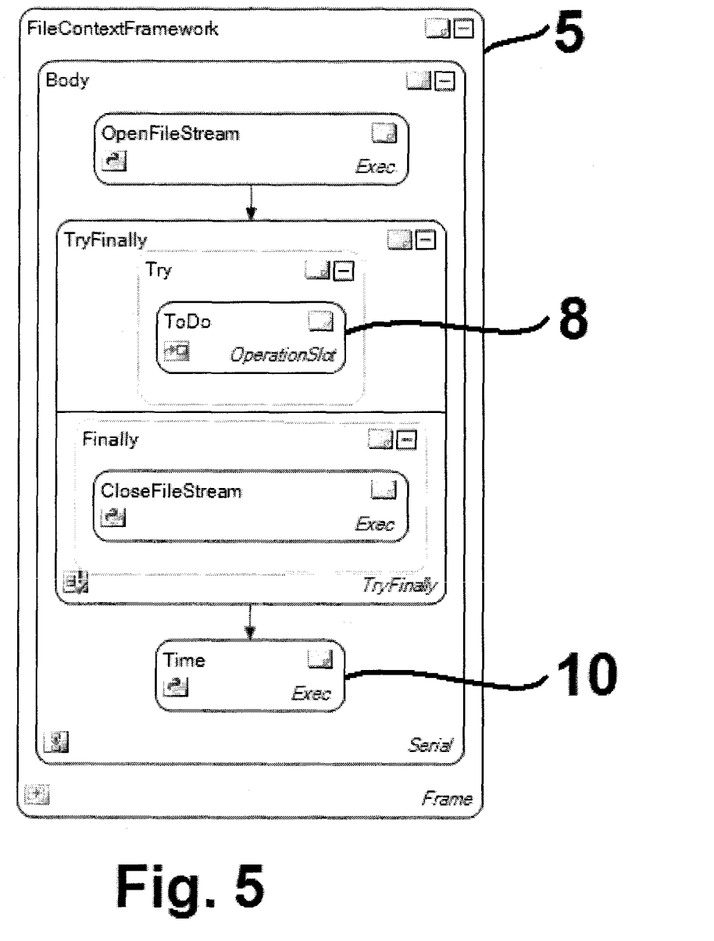
FIG. 5 shows the functionally expanded graphical library functional element of FIG. 3.

The particular advantage of configuration device 1 of the invention is that a change in a graphical library functional element 5 of instances 6 of graphical library functional element 5 is made in test sequences, although instances 6 of graphical library functional element 5 are individualized by the instance functionality. It is shown in FIG. 5 that graphical library functional element 5 has been expanded by an additional functional element 10; this has the effect that all instances 6 of library functional element 5 reproduce this addition, although they have been individualized by function placeholder 8 and the instance functionality stored there.

Function placeholder 8 and the instance functionality stored there allow the central maintenance of different individual instances 6 of a graphical library functional element 5; there is no need accordingly to make copies of individualized library functional elements in test sequences and to maintain each separately; a new library functional element need not be set up for each individual version of a library functional element; the maintenance of test sequences is thereby greatly simplified, and it is possible to maintain a clear overview of libraries of graphical library functional elements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A configuration device for graphical creation of at least one test sequence for controlling a test device having at least one electronic computer, the test device being controllable according to the created test sequence, the configuration device comprising:
   at least one display device; and
   graphical library functional elements displayed with the display device in a library field, at least one of the library functional elements having a plurality of functions and a function placeholder,
   wherein the test sequence is created by placing at least one instance of a first library functional element in a configuration field,
   wherein the at least one instance of the first library functional element reference the first library functional element itself, said at least one instance being placed in the configuration field,
   wherein the function placeholder of the first library functional element provides an individualized instance functionality in the at least one instance such that the at least one instance has a different instance functionality than other instances of he first library functional element, and such that the at least one instance has the plurality of functions of the first library functional element and the individualized instance functionality, and
   wherein the reference of the at least one instance to the first library functional element is retained even though the function placeholder provide the individualized instance functionality in the at least one instance.

2. The configuration device according to claim 1, wherein a test sequence created in the configuration field or a partial test sequence is definable as a graphical library functional element.

3. The configuration device according to claim 1, wherein, in a reduced display of the at least one instance of the first graphical library functional element with the function placeholder, only the function placeholder is shown.

4. The configuration device according to claim 1, wherein changes in a graphical library functional element of instances of the graphical library functional element are made in test sequences.

5. The configuration device according to claim 1, wherein function placeholders are configured to be used within function placeholders and/or graphical library functional elements are provided once again over generations of derivations with function placeholders.

6. The configuration device according to claim 1, wherein different versions of the instance functionality of the function placeholder of the first graphical library functional element are determined and displayed with the display device.

7. The configuration device according to claim 6, wherein the function placeholder of an instance of a graphical library function element is assigned an already existing version of the instance functionality of the function placeholder by selection of a version from various displayed versions of the instance functionality.

8. The configuration device according to claim 1, wherein the individualized instance functionalities that are stored in the function placeholder are not part of the first library functional element.

9. The configuration device according to claim 1, wherein each of the library functional elements have the plurality of functions and the function placeholder.

\* \* \* \* \*